United States Patent Office 3,153,970
Patented Oct. 27, 1964

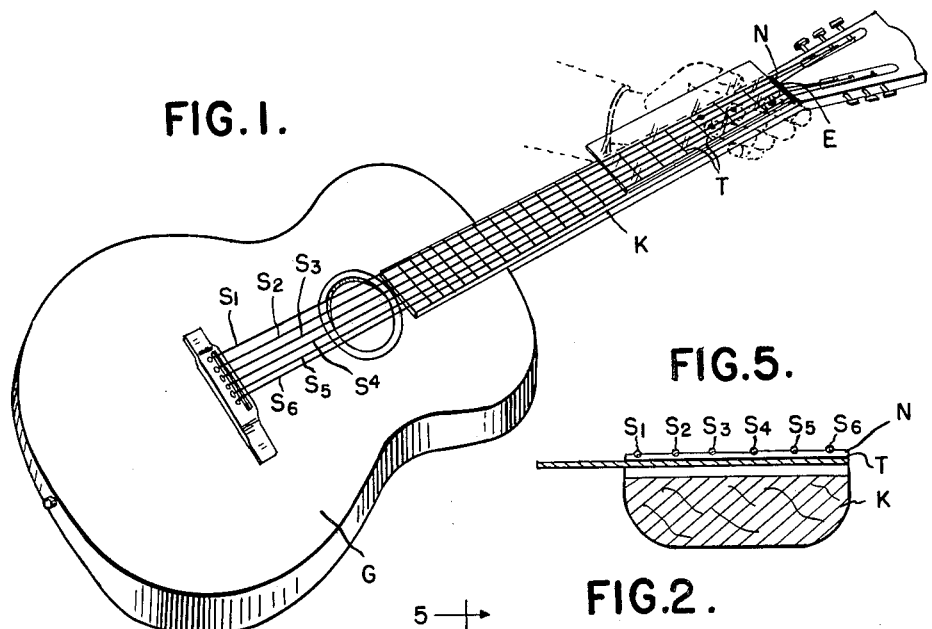
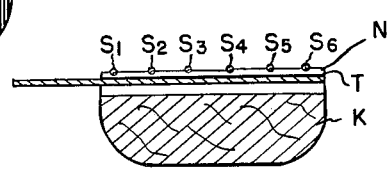
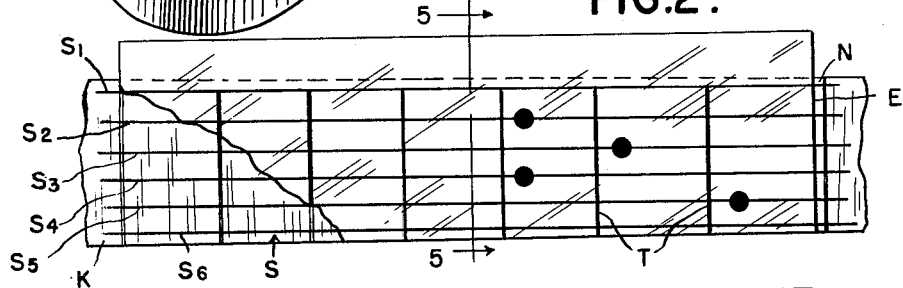
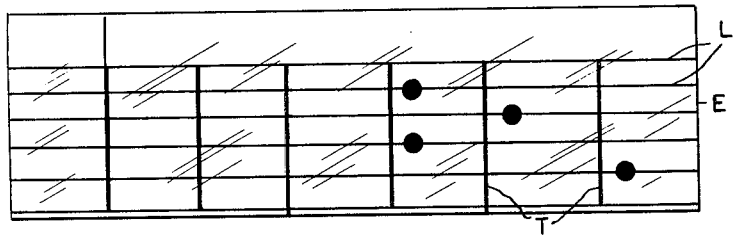
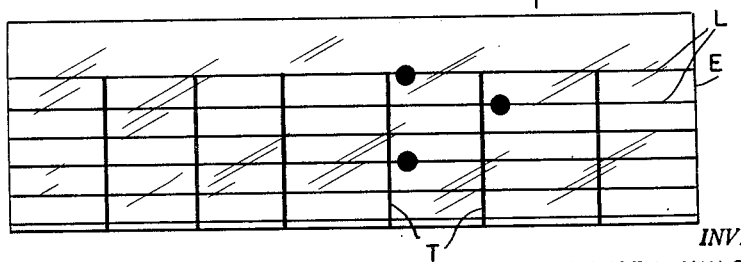

3,153,970
AID FOR STRINGED INSTRUMENTS
Royce L. Mulchi, 30841 Marshall, Southfield, Mich.
Filed Dec. 18, 1961, Ser. No. 159,939
3 Claims. (Cl. 84—485)

The invention relates to the musical arts and more particularly to stringed instruments. The invention comprehends a new method for teaching a student to play a stringed instrument. It also comprehends a new device which may be considered an aid for stringed instruments.

Although the invention has a broad application to stringed instruments in general, it is more particularly adapted in connection with a guitar and other instruments of a similar nature. The invention is particularly useful as an aid to the playing of chords as an accompanist for the rendition of a musical composition where the melody is often carried by the human voice or by some musical instrument other than the guitar.

A novice learning the art of playing a guitar must learn the technique of this particular instrument. While the ability to play a guitar may be acquired only through practice, time and effort in learning may be conserved if a skillful approach is made available to the student. The present invention constitutes an aid to the acquisition of the technical ability to select and sound the proper chord at the proper time. The invention may be used for the rendition of a composition or it may be used only in practice for the purpose of teaching a student how to gain the necessary skill for operating the instrument in the conventional manner.

With the above objects in view, the invention is hereinafter more fully described and illustrated in the accompanying drawings wherein:

FIGURE 1 illustrates a guitar utilizing the aid to which the present invention is directed.

FIGURE 2 is an enlarged view showing the stringed portion only of the guitar.

FIGURE 3 is one of a series of cards for the guitar.

FIGURE 4 illustrates another of the series of cards.

FIGURE 5 is a cross section on the line 5—5 of FIGure 2.

The guitar G has a sounding board from which projects the handle portion forming the keyboard K. A series of strings $S_1$, $S_2$ through $S_6$ is arranged to extend from the bridge on the sounding board over the nut N to the tuning keys on the head of the guitar. The strings $S_1$ through $S_6$ are tuned to the musical notes E, B, G, D, A and E respectively.

According to my invention, I provide a series of cards, each of a size such that it can be placed on the keyboard beneath the strings and above the frets. Each card has marked thereon a series of longitudinal lines L and transverse lines T corresponding respectively with the portions of the strings S and frets F of the guitar. The card may be inserted under the strings of the guitar to rest upon the frets with one edge E abutting the nut N. The card is adjusted laterally to bring the longitudinal markings L into coincidence with strings S. When the card has the edge E against the nut N, the transverse lines T are directly above the frets of the instrument. The card is marked to indicate the desired position of the fingers with respect to the lines B on the card to correspond with the correct position of the fingers on the strings in relation to the frets. The student can then place the fingers on the strings in the indicated positions on the card below the strings. Then by withdrawing the card while the fingers remain on the strings, the latter will be pressed into engagement with the adjacent frets so that the desired notes will be sounded when the strings are vibrated.

The invention contemplates a series of cards, each marked to indicate the correct finger positions for a certain chord. FIGURE 3 shows the positions for the C chord. FIGURE 4 shows the finger positions for the G chord. These two cards are sufficiently representative so that further illustration is unnecessary. The invention contemplates as many different cards as is necessary to illustrate all chords with which the student must become familiar in order to skillfully play the instrument.

FIGURE 1 shows in dotted lines the position of the hand with respect to the keyboard. FIGURES 3 and 4 show the finger positions for the C and G chords respectively.

With the card in position under the strings of the instrument, the student places the tips of the fingers in the positions marked on the card, at the same time using the thumb to hold the hand steady with respect to the sounding board. After the position of the fingers has been made to coincide with the markings on the card, the card is then withdrawn leaving the finger tips in position to contact with the respective strings. A novice finds some difficulty in maintaining the fingers in the precise arrangement necessary and by the use of the card constituting the invention, the student may practice the fingering until the necessary skill is acquired.

From the above, it will be apparent that the invention contemplates a series of cards which can be alternatively placed in position on the finger board of a guitar. The invention can be used in connection with instruments other than the guitar by suitably modifying the cards to correspond with the other stringed instruments. For example, the invention may be readily applied to ukuleles, mandolins and banjos, etc.

What I claim as my invention is:

1. The method of operating a musical instrument having a keyboard, frets and strings which comprises first inserting a card beneath the strings of the instrument and above the keyboard and frets thereof, said card having indicia thereon to show the relative positions of the several fingers necessary for sounding a particular chord, causing the fingers of the hand to be placed on the strings above the indicia, and removing the card while the hand and fingers are firmly held in relation to the strings thereby permitting the fingers to remain in contact with the strings in the desired position while said strings are thereby caused to engage the proper frets to sound the desired chord.

2. The combination with a musical instrument including a handle forming a keyboard, a series of transverse frets, a nut parallel to said frets and a series of strings engaging said nut and extending over said keyboard to leave a space between said strings and said frets, of a rigid card transversely slidable across said keyboard in said space between strings and frets, said card being of a width substantially greater than the width of said keyboard and having at one side thereof a series of longitudinal and transverse lines spaced to correspond with the strings and frets respectively, said card having an edge slidably engaging said nut to permit the card to be moved laterally to bring the lines thereof into coincidence with the strings and frets of the instrument and finger markings on said cards visible beneath the strings of the instrument indicating the finger positions for sounding a particular chord represented by said card.

3. The method of teaching a student to play chords on a musical instrument of the type having a handle forming a keyboard, a series of transverse frets, a nut parallel to said frets and a series of strings engaging said nut and extending over the keyboard to leave a space between the strings and frets, which method comprises selecting from a series of cards a particular card having fingering indicia thereon corresponding to the chord to be taught to the student, said card having at one side thereof a series of longitudinal and transverse lines spaced to correspond with the strings and frets respectively, inserting said card in the space between the strings and the frets, sliding the card with an edge thereof engaging said nut, until the lines on said card are brought into coincidence with the strings and frets lying above the same, causing the fingers of the hand to be placed on the strings of the instrument above the fingering indicia on the card, and removing the card from beneath the strings while the hand and fingers are firmly held in position on said strings, and applying finger pressure to press said strings against the frets thereby correctly positioning the hand and fingers to sound the particular chord represented by the selected card.

References Cited in the file of this patent

UNITED STATES PATENTS

| | | |
|---|---|---|
| 826,379 | Sprotte | July 17, 1906 |
| 1,556,147 | Johnson et al. | Oct. 6, 1925 |
| 1,751,048 | Miessner | Mar. 18, 1930 |

FOREIGN PATENTS

| | | |
|---|---|---|
| 353,827 | Germany | May 27, 1922 |
| 676,514 | France | Nov. 28, 1929 |